US006944651B2

(12) United States Patent
Onyon et al.

(10) Patent No.: US 6,944,651 B2
(45) Date of Patent: Sep. 13, 2005

(54) SINGLE CLICK SYNCHRONIZATION OF DATA FROM A PUBLIC INFORMATION STORE TO A PRIVATE INFORMATION STORE

(75) Inventors: Richard M. Onyon, San Jose, CA (US); David L. Multer, Santa Cruz, CA (US)

(73) Assignee: fusionOne, Inc., San Jose, CA (US)

( * ) Notice: Subject to any disclaimer, the term of this patent is extended or adjusted under 35 U.S.C. 154(b) by 803 days.

(21) Appl. No.: 09/860,903

(22) Filed: May 17, 2001

(65) Prior Publication Data

US 2002/0038316 A1 Mar. 28, 2002

Related U.S. Application Data

(60) Provisional application No. 60/205,844, filed on May 19, 2000.

(51) Int. Cl.[7] .............................................. G06F 13/00
(52) U.S. Cl. ...................................................... 709/217
(58) Field of Search ................................ 709/201, 203, 709/204, 212, 213, 216, 217, 248, 250, 200; 707/200, 201

(56) References Cited

U.S. PATENT DOCUMENTS

| 5,130,993 A | 7/1992 | Gutman et al. |
| 5,392,390 A | 2/1995 | Crozier |
| 5,519,606 A | 5/1996 | Frid-Nielsen et al. |
| 5,623,661 A | 4/1997 | Hon |
| 5,628,005 A | 5/1997 | Hurvig |

(Continued)

FOREIGN PATENT DOCUMENTS

| EP | 0 986 225 A1 | 3/2000 |
| EP | 1180890 A2 | 2/2002 |
| JP | 11242620 | 9/1999 |
| JP | 11242677 | 9/1999 |
| WO | WO 97 04391 | 2/1997 |

(Continued)

OTHER PUBLICATIONS

Internate Mail Consortium: "vCard Overview," Retrieved from the Internet: www.imc.org/pdi/vcardoverview.html, Oct. 13, 1998.
Internate Mail Consortium: "vCard The Electronic Business Card," Retrieved from the Internet: www.imc.org/pdi/vcard-white.html, Jan. 1, 1997.

*Primary Examiner*—Robert B. Harrell
(74) *Attorney, Agent, or Firm*—Vierra Magen Marcus Harmon & DeNiro LLP (57) ABSTRACT

A method for transferring public information to a private information store maintained by a private information space manager. The method may include the steps of selecting public information from a public information source; initiating a sync request by selecting a sync request button on the public information web site; and identifying the private information space were the public information is to be stored. In a further aspect, the invention comprises a system for synchronizing public content from a public information web site to a private information store. The system may include a sync enable button on the public information web site; a pop-up window provided by a private information store provided responsive to the sync enable button on the public information web site; and a sync interface transfer button on the pop-up window initiating transfer of the public information to the private information store. In a further aspect, the public information web site is provided by an affiliate server and said affiliate server includes code enabling said sync button by directing a client web browser to the private information store provider. The system may further include at least one synchronization routine synchronizing the public information data with the private information space.

60 Claims, 6 Drawing Sheets

U.S. PATENT DOCUMENTS

| | | | |
|---|---|---|---|
| 5,630,081 A | 5/1997 | Rybicki et al. |
| 5,649,195 A | 7/1997 | Scott et al. |
| 5,666,553 A | 9/1997 | Crozier |
| 5,682,524 A | 10/1997 | Freund et al. |
| 5,684,990 A | 11/1997 | Boothby |
| 5,694,596 A | 12/1997 | Campbell |
| 5,701,423 A | 12/1997 | Crozier |
| 5,706,509 A | 1/1998 | Man-Hak Tso |
| 5,710,922 A | 1/1998 | Alley et al. |
| 5,727,202 A | 3/1998 | Kucala |
| 5,729,735 A | 3/1998 | Meyering |
| 5,729,743 A | 3/1998 | Squibb |
| 5,742,792 A | 4/1998 | Yanai et al. |
| 5,745,906 A | 4/1998 | Squibb |
| 5,758,150 A | 5/1998 | Bell et al. |
| 5,768,597 A | 6/1998 | Simm |
| 5,771,354 A | 6/1998 | Crawford |
| 5,778,346 A | 7/1998 | Frid-Nielsen et al. |
| 5,787,247 A | 7/1998 | Norin et al. |
| 5,787,262 A | 7/1998 | Shakib et al. |
| 5,809,497 A | 9/1998 | Freund et al. |
| 5,812,773 A | 9/1998 | Norin |
| 5,812,793 A | 9/1998 | Shakib et al. |
| 5,832,489 A | 11/1998 | Kucala |
| 5,832,519 A | 11/1998 | Bowen et al. |
| 5,845,283 A | 12/1998 | Williams et al. |
| 5,875,296 A | 2/1999 | Shi et al. |
| 5,884,323 A | 3/1999 | Hawkins et al. |
| 5,884,325 A | 3/1999 | Bauer et al. |
| 5,893,119 A | 4/1999 | Squibb |
| 5,897,640 A | 4/1999 | Veghte et al. |
| 5,897,642 A | 4/1999 | Capossela et al. |
| 5,937,405 A | 8/1999 | Campbell |
| 5,943,676 A | 8/1999 | Boothby |
| 5,961,590 A | 10/1999 | Mendez et al. |
| 5,968,131 A | 10/1999 | Mendez et al. |
| 5,974,238 A | 10/1999 | Chase, Jr. |
| 5,974,563 A | 10/1999 | Beeler, Jr. |
| 6,000,000 A | 12/1999 | Hawkins et al. |
| 6,006,274 A | 12/1999 | Hawkins et al. |
| 6,012,063 A | 1/2000 | Bodnar |
| 6,016,478 A | 1/2000 | Zhang et al. |
| 6,023,708 A | 2/2000 | Mendez et al. |
| 6,023,723 A | 2/2000 | McCormick et al. |
| 6,034,621 A | 3/2000 | Kaufman |
| 6,044,381 A | 3/2000 | Boothby et al. |
| 6,052,735 A | 4/2000 | Ulrich et al. |
| 6,058,399 A | 5/2000 | Morag et al. |
| 6,061,790 A | 5/2000 | Bodnar |
| 6,131,096 A | 10/2000 | Ng et al. |
| 6,131,116 A | 10/2000 | Riggins et al. |
| 6,141,011 A | 10/2000 | Bodnar et al. |
| 6,141,664 A | 10/2000 | Boothby |
| 6,151,606 A | 11/2000 | Mendez |
| 6,182,117 B1 | 1/2001 | Christie et al. |
| 6,202,085 B1 | 3/2001 | Benson et al. |
| 6,205,448 B1 | 3/2001 | Kruglikov et al. |
| 6,212,529 B1 | 4/2001 | Boothby et al. |
| 6,216,131 B1 | 4/2001 | Liu et al. |
| 6,219,694 B1 | 4/2001 | Lazaridis et al. |
| 6,223,187 B1 | 4/2001 | Boothby et al. |
| 6,226,650 B1 | 5/2001 | Mahajan et al. |
| 6,247,135 B1 | 6/2001 | Feague |
| 6,272,545 B1 | 8/2001 | Flanagin et al. |
| 6,275,831 B1 | 8/2001 | Bodnar et al. |
| 6,282,698 B1 | 8/2001 | Baker et al. |
| 6,295,541 B1 | 9/2001 | Bodnar et al. |
| 6,304,881 B1 | 10/2001 | Halim et al. |
| 6,324,544 B1 | 11/2001 | Alam et al. |
| 6,330,568 B1 | 12/2001 | Boothby et al. |
| 6,341,316 B1 * | 1/2002 | Kloba et al. ................ 709/248 |
| 6,397,351 B1 | 5/2002 | Miller et al. |
| 6,401,104 B1 | 6/2002 | LaRue et al. |
| 6,405,218 B1 | 6/2002 | Boothby |
| 6,449,622 B1 | 9/2002 | LaRue et al. |
| 6,457,062 B1 | 9/2002 | Pivowar et al. |
| 6,487,560 B1 | 11/2002 | LaRue et al. |
| 2001/0044805 A1 | 11/2001 | Multer et al. |
| 2002/0138765 A1 | 9/2002 | Fishman et al. |
| 2003/0069874 A1 | 4/2003 | Hertzog et al. |

FOREIGN PATENT DOCUMENTS

| | | |
|---|---|---|
| WO | WO 97 41520 | 11/1997 |
| WO | WO 98 21648 | 5/1998 |
| WO | WO 98 54662 | 12/1998 |
| WO | WO 99/05813 | 2/1999 |
| WO | WO 99/06900 | 2/1999 |
| WO | WO 99/36870 | 7/1999 |
| WO | WO 99/45451 | 9/1999 |
| WO | WO 99/45484 | 9/1999 |
| WO | WO 99/50761 | 10/1999 |
| WO | WO 00/11832 | 3/2000 |
| WO | WO 00/16222 | 3/2000 |
| WO | WO 00/29998 | 5/2000 |
| WO | WO 01/71539 | 9/2001 |

* cited by examiner

SINGLE CLICK SYNCHRONIZATION OF DATA FROM A PUBLIC INFORMATION STORE TO A PRIVATE INFORMATION STORE

This application claims the benefit of U.S. Provisional Application No. 60/205,844, entitled SINGLE CLICK DATA SYNCHRONIZATION OF PUBLIC AND PRIVATE DATA filed May 19, 2000, incorporated herein by reference.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

BACKGROUND OF THE INVENTION

1. Field of the Invention

The invention relates to the transfer of public data in a public information space which may include any number of devices for storing such data.

2. Description of the Related Art

Calendars and address books have traditionally been the means people use to track task and contact information relating to both personal and professional matters. Recently, with the growth of personal computing and the Internet, a migration from paper calendars and address books toward electronic personal information managers (PIMs) is taking place. PIMs may comprise software applications running on a personal or laptop computer and personal digital assistants (PDAs)—small, electronic devices of varying types, all of which store varying types of reminder, contact, task, notes, and text information as well as other types of files.

Generally, software PIMs include products such as Microsoft Outlook, Interactive Commerce Corporation's ACT!, and other similar programs are designed to run on a computer. PDA devices include devices such as those using the Palm or Microsoft Windows Pocket PC operating systems, as well as other, more basic contact and calendar devices. Each PDA generally includes calendar, contact, personal tasks, notes, documents, and other information, while more sophisticated devices allow a user to fax, send e-mails, and communicate in other ways both by wireline and wirelessly. Even advanced cellular phones carry enough memory and processing power to store contact information, surf the web, and provide text messaging. Along with the growth in the sophistication of these devices, the need to transfer information between them has grown significantly as well.

Many Internet web portals also now provide file storage, contact and calendar services. For example, major service portals such as Yahoo!, Excite, Lycos, Snap! and others provide on-line calender and contact manager services via a web browser and user account. This allows a user to log in to their own calendar and address book from any Internet-capable web browsing application since the user's individual data is stored on a host server maintained by the web portal provider.

Beyond mere web-based calendar applications, web-based service sites have been developed which provide people with indicators of important events which they can have synchronize with their web based calendar systems. For example, specific events in a Yahoo! calendar prompt the user to "add to my calendar," and when selected, the event is transferred to the user's account data.

Hence each individual is presented with a multitude of different device types and options for maintaining a "personal information space"—a data store of information customized by, and on behalf of the user which contains both public data the user puts into their personal space, private events in the space, and other data objects such as text files or data files which belong to the user. Once a personal information space is defined, users are presented with the daunting task of keeping information between the different devices in the space synchronized. For example, if an individual keeps a calendar of information on a personal computer in his or her office using a particular personal information manager application, the individual would generally like to have the same information available in a cellular phone, hand-held organizer, and perhaps a home personal computer. The individual may additionally have a notebook computer, and desire all information on the office computer to be synchronized with the notebook.

Until now, synchronization between both documents and personal information managers has occurred through direct connection between the devices, and generally directly between applications such as a personal information manager in one device and a personal information manager in another device or using an intermediary sync-mapping program. In other cases, direct transfer between applications such as transfer between Microsoft's Outlook® computer-based client and Microsoft's Windows CE "Pocket Outlook" application, is possible. Nevertheless, in both cases, synchronization occurs through direct connection between a personal computer and the personal computing device. While this connection is generally via a cable directly connecting, for example, Palm® device in a cradle to the personal computer, the connection may be wireless as well.

Such synchronization schemes are generally relatively inefficient since they require full band-width of the document or binary file to be transferred via the synchronization link. In addition, at some level the synchronization programs require interaction by the user to map certain fields between different programs.

U.S. Pat. Nos. 6,694,336 and 6,671,757 ("the '336 and '757 Patents"), and U.S. patent application Ser. No. 09/491,675, currently pending ("the '675 Application"), disclose a novel method and system for synchronization of personal information including that which is conventionally found in desktop applications, personal digital assistants, palm computers, and website calendar services, as well as any content in the personal information space including file systems, contact information and/or calendaring information. In one aspect, the system disclosed in the '336 and 757 Patents and the '675 Application comprises a series of device engines which can be utilized on or in conjunction with any personal information manager application or device, on servers, or both, which can connect via a communications network, such as the Internet, to transfer information in the form of differenced data between respective applications and respective devices. In essence, the system of the '336 and '757 Patents and the '675 Application creates a personal information space or personal information store that is comprised of the set of transactions which defines the movement of information between one device, the intermediate storage server, and other devices, and which is unique to an individual user or identifier.

The personal information space is defined by the content which is specific to and controlled by an individual user, generally entered by or under the control of the individual user, and which includes "public" events and data, those generally known to others, and "private" events and data which are not intended to be shared with others. It should be recognized that each of the aforementioned criteria is not exclusive or required, but defines a characteristic of the term "personal information space" as that term is used herein.

A number of different embodiments are disclosed in the aforementioned co-pending patent applications. However, the manner in which information is input to each of the devices which may be defined as part of the personal information space varies. Certain devices take direct input from other electronic devices such as scanners or electronic input such as vCARDs. In most cases, the information must be manually input via the user interface of one of the devices, e.g. typing contact information into a computer application.

However, with the advent and growth of the Internet, a vast quantity of public information is available with no means for easily transferring this public information into a user's personal information space. While applications such as Yahoo! calendar allow a user to pick certain events and click an add button, therefore including it in the calendar, and subsequently allow a user to run a separate synchronization process between the calendar and a desktop application, this requires a number of multiple steps and information which has been synchronized between the web-based calendar and the application-based calendar on the desktop must then be further synchronized to other devices.

SUMMARY OF THE INVENTION

The invention facilitates the addition of information to a private information space and, in one embodiment, enables the use of a web browser to provide single or one-click data synchronization of public source information to a private information store of a user. Multiple aspects of the invention are described herein. In one aspect, the invention, roughly described, comprises a method for transferring public information to a private information store maintained by a private information space manager. The method may include the steps of selecting public information from a public information source; initiating a sync request by selecting a sync request button on the public information web site; and identifying the private information space were the public information is to be stored.

The public information may be a digital media file such as an MPEG audio/video file or an MP3 encoded audio file, another type of data file, contact information, event/calendar information, or any information generally available in the public domain which a user may wish to move to a private information space.

In a further aspect, the invention comprises a system for synchronizing public content from a public information web site to a private information store. The system may include a sync enable button on the public information web site; a pop-up window provided by a private information store provider responsive to the sync enable button on the public information web site; and a sync interface transfer button on the pop-up window initiating transfer of the public information to the private information store. In a further aspect, the public information web site is provided by an affiliate server and said affiliate server includes code enabling said sync button by directing a client web browser to the private information store provider. The system may further include at least one synchronization routine synchronizing the public information data with the private information space.

In general, the private information store comprises a quantity of data which is selected by and retained on behalf of a particular user. In one case, this occurs on a server which is coupled to a global communications network. The private information store may comprise a plurality of personal information devices, each of which includes at least a portion of an individual's private information data.

In yet another aspect the invention comprises a system for synchronizing public content from a public information web site to a private information store. In this aspect, the invention comprises code enabling a sync enable button on the public information web site; and code responsive to the sync enable button mapping the public content to a field and transmitting the mapped data to a private information store. In a further aspect, the code enabling said sync button directs a client web browser to the private information store provider. The code responsive to the sync enable button may generate a window which includes a user login and retrieve login information input by a user. This aspect of the invention may further include at least one synchronization routine synchronizing the public content with the private information store.

In a further aspect, the invention comprises a method for transferring public information from a public information source to a private information space. In this aspect the method comprises: receiving public information destined for the private information source responsive to a user initiated indication that the public information source is to be provided to the private information space; and transmitting the public information identified in the receiving step to the private information store.

In a still further aspect, the invention is a method for inputting public information into a plurality of personal information managers. In this context, the method comprises: determining the content to be synchronized by receiving information from a public information store via a communications network; storing information in a data store specifically identified with a particular user; and providing the information to at least one personal information device capable of coupling to the data store via the global communications network.

The present invention can be accomplished using hardware, software, or a combination of both hardware and software. The software used for the present invention is stored on one or more processor readable storage media including hard disk drives, CD-ROMs, DVDS, optical disks, floppy disks, tape drives, RAM, ROM or other suitable storage devices. In alternative embodiments, some or all of the software can be replaced by dedicated hardware including custom integrated circuits, gate arrays, FPGAS, PLDS, and special purpose computers.

These and other objects and advantages of the present invention will appear more clearly from the following description in which the preferred embodiment of the invention has been set forth in conjunction with the drawings.

BRIEF DESCRIPTION OF THE DRAWINGS

The invention will be described with respect to the particular embodiments thereof. Other objects, features, and advantages of the invention will become apparent with reference to the specification and drawings in which.

DETAILED DESCRIPTION

In one aspect, the invention defined herein comprises a unique system and method for transferring public content which is readily available in any number of sources in public information space to private information space based on an individual's selection of the public data and confirmation that such data is to be provided to the personal information space. Following provision of the data to the personal information space, the material can be transferred within the space to any number of personal information managers including desktop applications, personal digital assistants (PDA's), web-based applications, and the like.

As used herein the term "public" when referring to data or information space refers to data and information space outside that of a user's personally defined information space. The term does not require that all "public" data, or "public" information space be available to all users, and can comprise data and information that is only accessible to users on a private system or network, but which a particular user has not added to his or her private information space.

The "personal information space" can be housed physically on an intermediate server, or it can be stored on any one or more devices which communicates with other devices. One required characteristic, however, is that the personal information space include the ability to share information in the space with any of the users' personal information devices or applications, and is therefore not limited to any one type of device in direct communication with any other type of device, such as, for example, a web-based calendar communicating directly with Microsoft Outlook to synchronize events between the two, or a PDA such as a Palm operating system device communicating directly with the calendar content stored on an individual's computer. One example of private information space is the transactional based extraction, transfer, broadcast, storage and synchronization systems set forth in the '336 and '757 Patents and the '675 Application, each of which is hereby specifically incorporated by reference.

Figure 1:
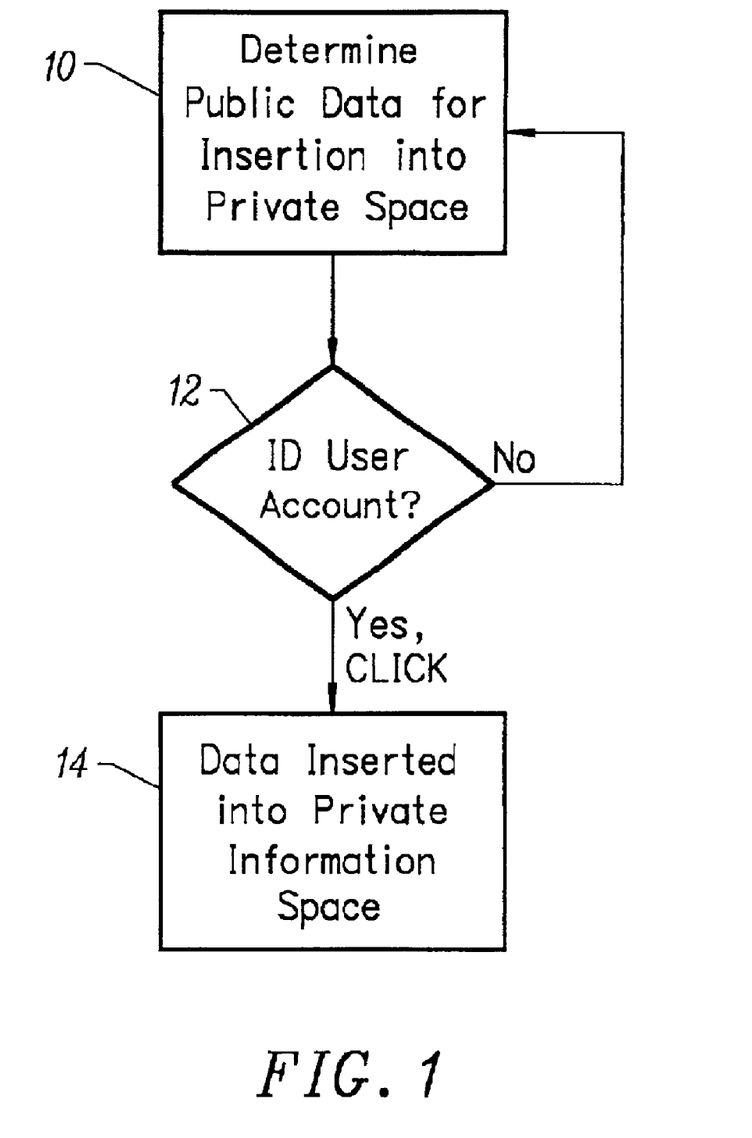
FIG. 1 is a block level diagram of one embodiment of the present invention.

FIG. 1 shows a block diagram of the general method of the present invention. At step 10, a user determines which public data the user desires to be inserted into the user's private information space. The step of determining 10 can include any number of different operations. In one aspect, it can comprise selecting a file from a file system using a standard file system interface such as a command line interface, a web browser, Microsoft Explorer, FTP, a voice command, or a specifically-designed application interface. In a further aspect, the step of determining may comprise searching using a web-based search engine to ascertain public HTML data which the user wishes to record as a file and synchronize to the user's personal information space. In a third aspect, the user may search public records for address and contact information, select the address and contact information which the user wishes to synchronize, and identify that information as being that which the user desires to add to his personal information space. In yet another embodiment, the user may identify a public event, such as a concert or performance which is identified on a public website such as a web portal or on a specific website such as that which may be provided to synchronize to the user's personal information space. In a further embodiment, selection of the data to be synchronized can be automatic. For example, a user may associate an event such as an airline reservation with an automatic synchronization request which will update changes to public based data when changes in the data occur, and optionally notify the user when such change has occurred.

A user identification step 12 ensures that the information selected in step 10 will in fact be provided to the correct personal information space for the user selecting the public data. Such identification can take place in the form of a separate login, or may use any unique identifier, such as a cookie inserted into a web browser on an individual's computer, to identify the user and the user's personal information space to which data selected at step 10 will be provided. Optionally, step 12 maybe further used to allow the user to determine whether the data which has been selected in step 10 is in fact the correct data which the user wishes to be inserted into the private information space. Once a selection is made at step 10, a separate identifying step, such as a pop-up window setting forth a user name and password login, can provide the user at least one opportunity to identify themselves, as well as ensure that erroneous information is not provided to his or her personal information space. If the data is not correct, the method returns to step 10. If the data is correct, the user may indicate his acceptance of such data by forming a user-perceptible action, such as clicking on a button in the web browser, application, or other indicating affirmation of the correctness of the data, after which at step 14, the data is inserted into the private information space. Once inserted into the private information space, the data can be synchronized to any number of different devices as described in the '336 and '757 Patents and the '675 Application.

Figure 2A:
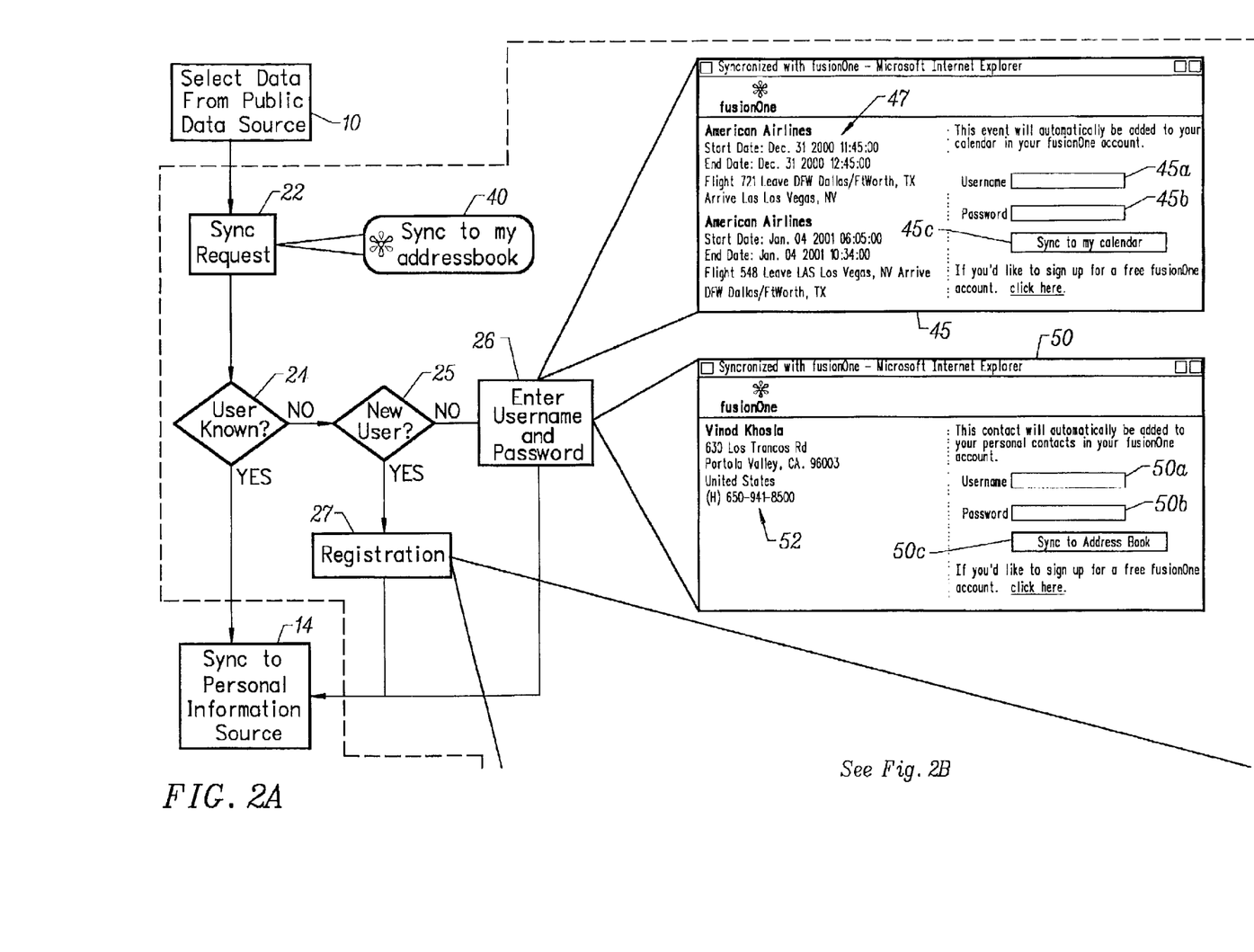
FIG. 2 is a block diagram of the user interaction with the system and method of the present invention.
Figure 2B:
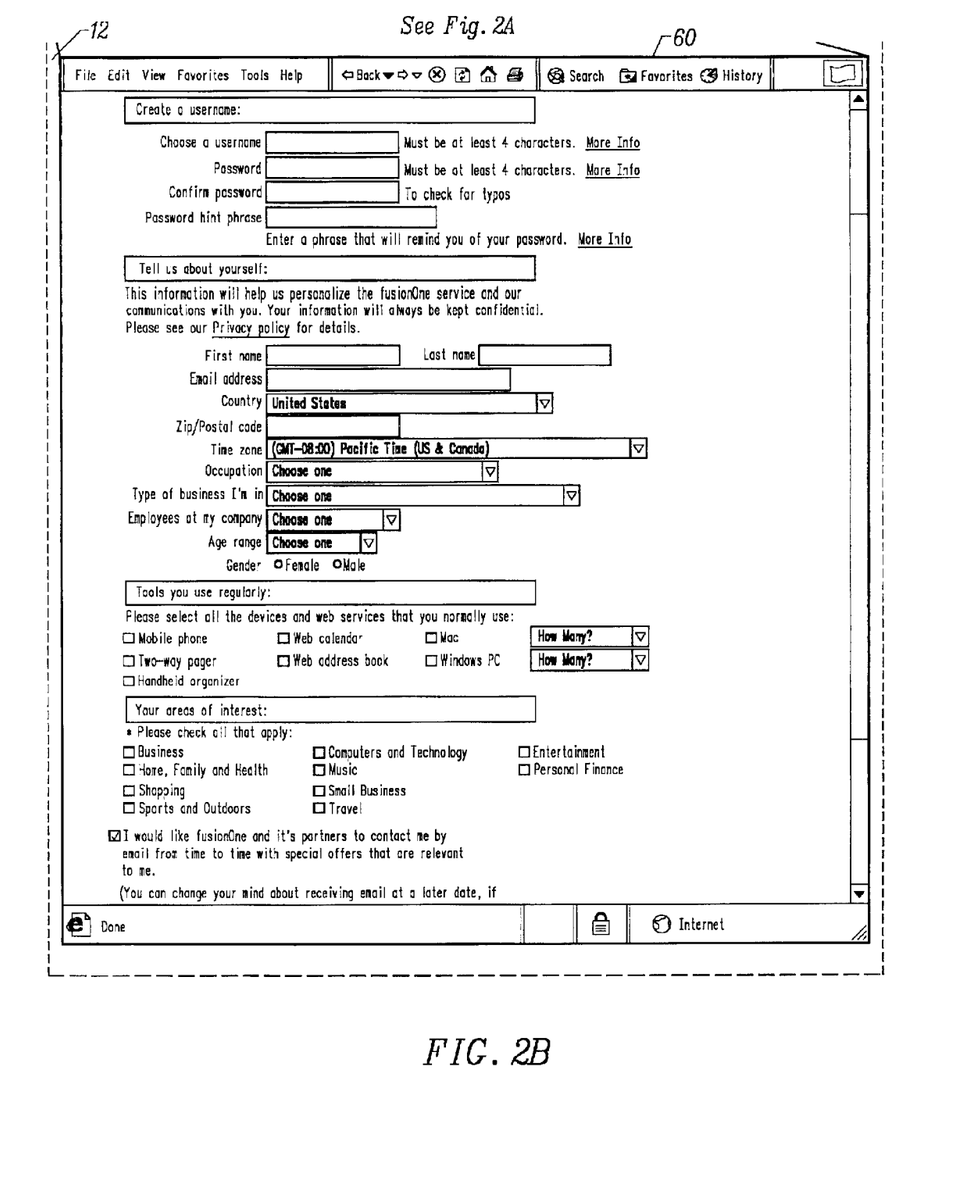

FIG. 2 shows one manner in which public data may be synchronized into a user-identified personal information space. The method shown in FIG. 2 is shown from an individual user's perspective of how the steps in the method occur.

As shown in FIG. 2, after data is selected at step 10 from the data source in a manner such as that defined above, a sync request at step 22 is placed by the user. The sync request may comprise clicking on a button 40 in a web interface. It should be recognized that other alternatives for initiating the sync request may be utilized in accordance with the present invention. The button may be physical or virtual, and may comprise menu selection, "click" button, a combination of keystrokes, or any other user-initiated user-interface event.

Following the sync request at step 22, a determination of whether the user is known to the personal information space 14 must be made. At step 24, a yes answer may comprise determining the user's identify from a cookie placed on the user's web browser on the user's personal computer. Other forms of identification may alternatively be used, such as remembering the user's identity from the previous login entry, or other forms of a unique identification.

If the user's identity is not known, at step 26 the user is provided with an opportunity to enter the user name and password. It should be recognized that the user name and password in this instance may provide a login, but in general, all that is required is the provision of a unique identifier to the personal information space to which the information is to be synchronized. Graphics 45 and 50 show two alternatives of calendar information and contact information pop-up windows, respectively, which allow the user to verify the information to be synced and provide their login information. In step 45, flight information for a particular user's travel itinerary is shown, along with a user name field 45a, a password field 45b, and an initiate synchronization button 45c. Likewise, window 50 shows contact information 52, and a user name field 50a, password field 50b, and an initiate synchronization button 50c. The user may provide the unique identifier user name and password to the system of the present invention in order to identify the personal information space to which data is to be inserted at step 14.

If the user is a new user at step 25, a registration interface 27 may be a provided so that the user may identify a new unique personal information space for that particular user. Registration may include providing information as shown in window 60 to identify the users personal information space. It should be recognized that the information shown in window 60 is exemplary and, at a minimum, all that is required is a unique user name to be associated with the personal information space.

Once the user information space is identified, the data can be inserted into the user's unique personal information space at step 14.

Figure 3:
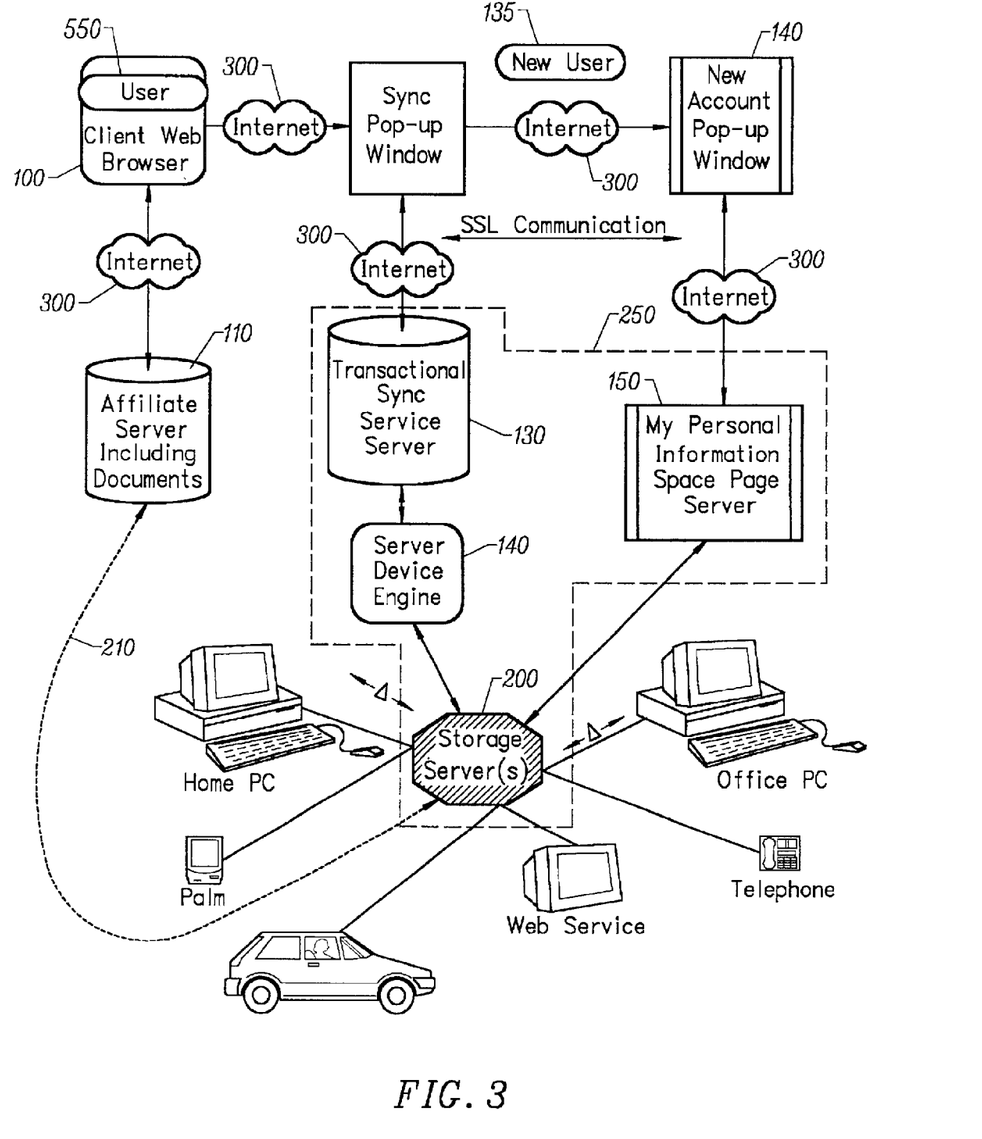
FIG. 3 is a diagram of one embodiment of the system of the present invention.

FIG. 3 shows a system in accordance with the present invention for transferring public information data from public information space to the personal information space of a particular user.

In FIG. 3, the user 550 is shown interacting with, for example, a web browser 100. The web browser allows the user access to public information space which may, for example, be available on the Internet. While the present invention will be described with respect to its implementation in an Internet environment wherein the interface is a client browser 100, it should be recognized that the user may act with other types of systems to access public content, including telephones which may have a sync-enabled environment, personal computers having other interfaces, such as application-specific interfaces, content managers or other applications which may provide data to the synchronization environment of the personal information space, or the like.

User 55 connects to affiliate server 110 via a communications network which, in FIG. 3 is represented as a global communications network 300, such as the Internet. It should be recognized that many types of communications networks may be used without departing from the spirit and scope of the present invention. In one implementation, the Internet is advantageously utilized since any number of devices are being designed which can couple to the Internet, including wireless devices, wireline devices, personal computers, personal digital assistants, automotive PC's, stereos, televisions, and the like. However, the global communications network may comprise a private network and data need not be transferred via the relatively public environment of the Internet.

Generally, public information may be provided by an affiliate server 110. The affiliate server 110 includes code, such as HTTP protocol code, which allows the implementation of the transference of public data from the affiliate server to the user's private information space. Some interaction between the client browser and the affiliate server must be required.

Affiliate server 110 may comprise an Internet World Wide Web server such as that as may be provided by a web portal service, such as Yahoo!, Excite, Snap, or Lycos, which provide an interface to public content such as address and contact information. Affiliate server 110 may also comprise a specialized web server such as a travel service server, a performance group's web server, an online retailer's web server, an auction house web server, or any number of different types of Internet-based businesses having content which a user will desire to synchronize with the user's personal information space. The affiliate server could also be a simple file server which provides access to data files and enables synchronization to the personal information space by implementing HTTP code in accordance with the following description using a secondary link or re-direct.

Affiliate server 110 includes, for each piece of content which the affiliate server system administrator deems appropriate for such synchronization, code enabling the display of a synchronization implementation interface, such as button 40 shown in FIG. 2. Hence, when a piece of data is provided by the affiliate server which a user wishes to synchronize to the private information space, as described above with respect to FIG. 2, the user is provided with a button 40 which, when clicked, initiates the synchronization process at step 100. Following clicking on button 40, a sync pop-up window 120 will be provided by a sync service server 130. If the sync button is linked to contact information, the code for the button will be as follows:

```
function fuseWindow( ) {
    msgWindow'
    open("https://tsync.server.com/servlet/tsynccontacts?w'popup
        &AID'101
        &FN'John+Smith
        &N.Family'Smith
        &N.First'John
        &ADR.Home.Street'1234+Los+Anywhere+Rd
        &ADR.Home.City'portola+valley
        &ADR.Home.State'CA
        &ADR.home.ZIP'55555
        &ADR.Home.Country'United+States
        &TEL.Home'555-555-8500",
        "remote","scrollbars,width'500,height'300"
    );
    if (msgWindow.opener"null) msgWindow.opener'self;
}
```

Sync server 130 is maintained by a sync service administrator who may control portions of the system of the invention denoted as being within dashed line 250. As shown in the above example, a servlet provided on the sync server 130 (identified in the code as tsync.server.com) maps data from the affiliate server 110 and the public environment fields used in the personal information space and displays the data/login window. Transactions between the affiliate server and the client browser comprise HTTP GET/POST operations using a MIME-type of application/x-www-form-url encoded. Each servlet requires that an affiliate ID (AID) be provided along with the actual contact information, which can then be transferred to the user's specific personal information space upon provision of the identifier for the personal information space. All request response data is MIME-type text/HTML and follows a name'value paradigm separated by an "&". It should be recognized that other paradigm mapping schemes and protocols may be utilized within the scope of the present invention.

If the user is known, sync server 130 can provide the information set forth above directly to a server device engine 140 which can then transfer the information to the personal information space stored in a data store 200 as described in the '336 and '757 Patents and the '675 Application.

If a user is not known, a new user registration routine is initiated at step 135, and a new account pop-up window 145 is generated. It should be communication between the synchronization pop-up window 120 and the new account pop-up window 145 occurs by secure socket layer (SSL) communication. The new account pop-up window will be provided by a web server 150 which may comprise a user interface specifically tailored to the individual user's personal information space. Via web server 150, the user is allowed to customize the types of devices and the types of information which are provided to those devices in the personal information space 200. Communication between the sync service server 130 and the server device engine 140 can occur behind the firewall provided by the sync service provider and hence there is no need for secure communication between the engine and the sync service server.

It should be recognized that code similar to that provided above with respect to content information can be utilized for synchronizing calendar information. Given the paradigm set forth above that field information and keyword values are defined in the aforementioned syntax, one of average skill in the art would recognize that any number of fields are required to synchronize different types of data. For example, with respect to content data, home address fields (city, state, zip, street, country, etc.), work address fields, e-mail fields, name fields, organization fields, and the like, are required. Likewise, in synching calendar information, calendar information such as dates, times, locations, notes, and the like must also be included. In addition, provision must be made for categorization of contact and calendar information. As one of average skill in the art will recognize, definition of such fields can be set forth in the aforementioned syntax code.

Also shown in FIG. 3 is a link-back feature 210 which may be implemented by the affiliate server manager or the system administrator of the present invention. The field set forth above in the function fuseWindow text may optionally include a field note &NOTE which may be populated with user notes and a link to the source of the public data. A link, such as a universal resource locator (URL), to the data which is being synchronized may be inserted by the affiliate server manager so that when a user views the data in the user's personal information space, the URL appears. This allows the user a quick way to return to the web page having the data through well-known object linking techniques. (When the user clicks on the universal resource locator in the notes field of the particular application which is viewing the notes field, the user's web browser 100 can be started and the user returned to the page from the affiliate server 110 containing the data of interest.)

It will be further recognized that the invention as set forth herein is not limited to the provision of contact and address data to the personal information space. For example, if a user decides to access files from an FTP server, such interface can provide the ability for the user to provide the files to the personal information space. One example of such provision would be to utilize the aforementioned system on a public information server which allows transference of data files, such as executables, documents, or digital music files (MP3's) from the public information space to the personal information space. Likewise, all types of devices are supported, including personal computers, PDA's, automotive PC's, and the like.

Hence, a user can, via the Internet, select data files for transference to the user's personal information space and output such files on any device which is coupled to a network.

Another alternative to the present invention involves a variation on the data selection step 10 wherein a user may select a number of different pieces of public information data for entry into the user's personal information space. For example, if the user selects to search a public information database which retrieves a number of results, the results page may appear as a list of results, each result having placed adjacent thereto a check-box which the user may then use to select or de-select a particular item. Multiple check-boxes can be selected by the user, and the single sync request may be placed by depressing a virtual button 40 placed on the affiliate server page which is providing the public data.

It would then be recognized that the mapping of individual fields in each of the selections will be provided in a manner in accordance with that set forth above with respect to the function fuse window for each individual record selected by a check-box. However, only one single sync request 22 need be made for multiple items in the public domain.

Figure 4:
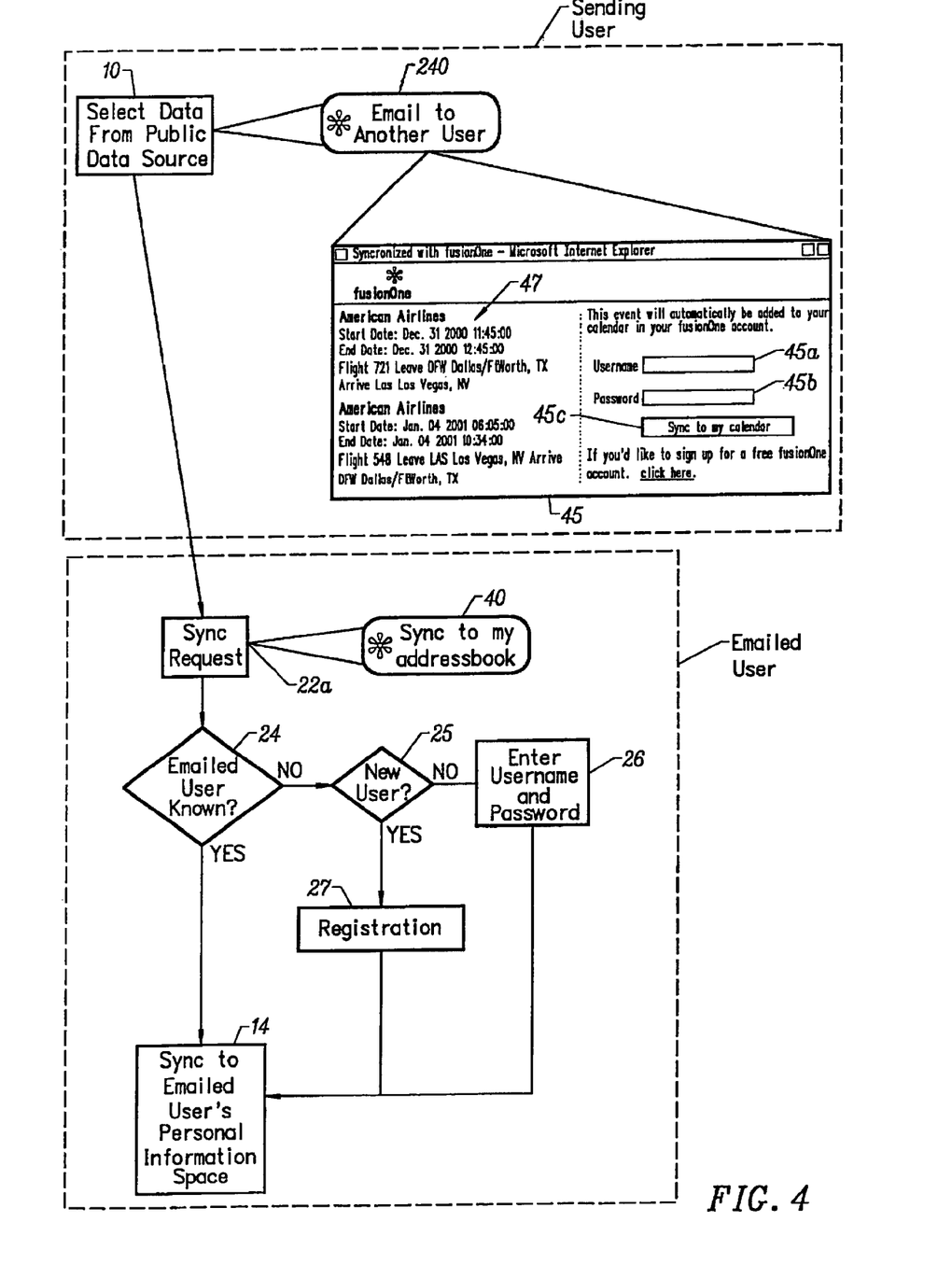
FIG. 4 is a block diagram of an alternative embodiment of the system of the present invention which allows to e-mail public data to another user's private information space.

FIG. 4 shows yet another alternative of the present invention whereby a first user, the "sending user," can choose to e-mail data in the public domain to a second user, hereinafter referred to as the "e-mailed user." As shown in FIG. 4, the sending user selects data from a public data source at step 10*a* and may, while syncing the data to his own calendar using a sync request, choose to have the information forwarded by e-mail to a second user. This may be functionally implemented in a number of ways: the user may depress a second button 240 which allows the public information selected at step 10*a* to be e-mailed to another user; depression of virtual button 240 may give rise to a second pop-up window requesting an e-mail address, which may then be entered by the sending user; or an e-mail address may be added to window 45 in a field name similar to 45*a* and 45*b* such that when the "sync to My Calendar@ button 45*c* is depressed, the system detects the presence of the e-mail address in the e-mail field and automatically sends the data 47 to the e-mailed user. It should be recognized that multiple e-mail fields or e-mail groups can be utilized in accordance comprise present invention.

Once the sending user has selected to e-mail the data to the e-mailed user, the e-mailed user must generate a sync request at step 22*a*. This allows the e-mailed user the choice of declining the information offered. The sync request 22*a* may be provided in a scripted e-mail identifying the sending user and providing the e-mailed user with a sync initiation button to initiate the aforementioned sync process, or an e-mail with a URL to a page having a form similar to box 45, allowing the e-mailed user to select whether or not to sync the data provided by the sending user to the e-mailed user's personal information space. In either implementation, the e-mailed user may be presented with a virtual button 40*a* to generate the e-mailed user's sync request. Subsequent to initiation of the e-mailed user's sync request, the syncing procedure for the e-mailed user proceeds in a manner similar to that set forth above with respect to FIG. 2: the system will first determine whether the e-mailed user is known at step 24*a*, allow the information to be synced at step 14, or generate a new user sign-up routine (steps 25, 26 and 27) as set forth above.

In order to enhance the usability of the data transfer system of the present invention, and to allow users who wish to place public information into a private information space and ease in doing so, an abbreviated user sign-up procedure is presented.

Figure 5:
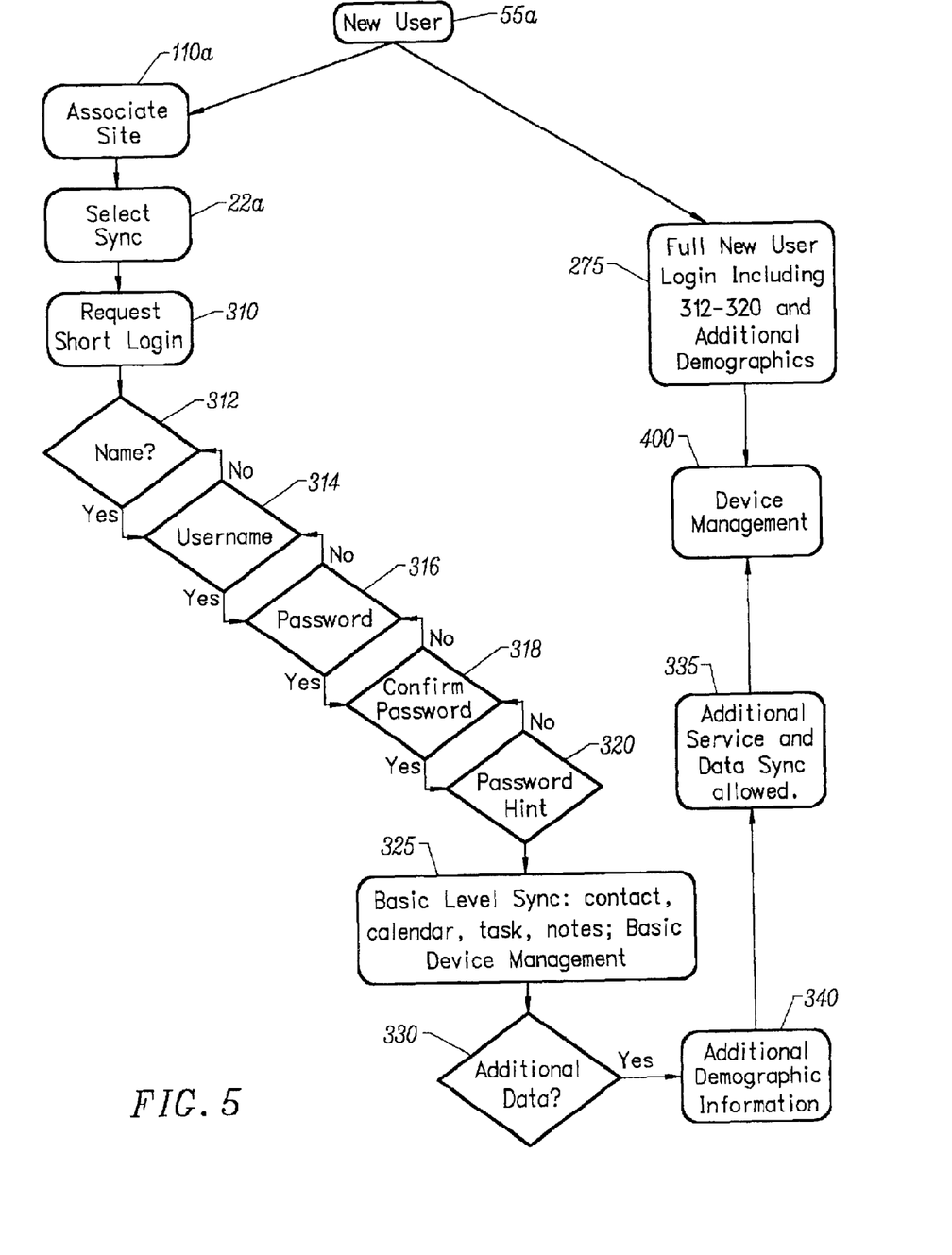
FIG. 5 is a flow chart of an abbreviated new user sign-up procedure used in accordance with the present invention.

FIG. 5 shows the abbreviated user log-in procedure for new users in accordance with the present invention. As shown in FIG. 5, a new user 55*a* accessing an associate site 110a may desire to institute transfer to the data to a private information space. Since new user 55a does not have a personal information space with the system administrator of the present invention, the user may not desire to spend a significant amount of time signing up for a private information space. In accordance with the invention, selecting a sync for a new user will provide the opportunity for the user to request a short log-in process 310. This may be done by providing a virtual button on the synchronization page which includes the public data, or on the log-in page 45 as shown in FIG. 2. A short log-in consists of entering data into five separate fields represented as steps 312–320 in FIG. 5. The five user's fields and data entries required are the user's real name 312, selection of a user name 314, entrance of a password 316, confirmation of the password entered at step 316 at step 318, and entrance of a password hint 320. It should be recognized that the five steps selected in FIG. 5 may be increased or decreased in number of accordance with the present invention. In essence, all that is required to define a personal information space is a user name 314. However, to enable security, password names and hints may be utilized.

Once completion of step 320 has occurred, the user is allowed to perform a basic level sync comprising a sub-set of all possible types of data which may be synced and perform basic device configuration functions (step 325). For example, the system may allow entrance of new public data and/or synchronization of contact information, calendar information, task information, and notes information. The user may continue to utilize the service of the present invention without additional log-in requirements if the user so desires. However, if the user desires to provide or sync additional types of information, such as full file data, then at step 330 the user is referred to an additional data entry screen 340. Additional demographic information 340 may then be required, including the types of devices the user will use, marketing information, the user's e-mail address, zip code, work information and the like, in order to allow the administrator of the present invention to provide additional value-added services. Once the additional demographic information 340 is provided, additional levels of services may be provided at step 335, including synchronization of data resources and the like. It should be recognized that the new user may follow a more complete, "full" log-in procedure 275 which combines the data entered at steps 312–320 and 340 to go directly to the full service provided by the system administrator The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method for transferring public information to a private information store maintained by a private information space manager, comprising:

selecting the public information from a public information source; and initiating a sync request by selecting a sync request button on the public information source, said step of initiating a sync request at least initiating the steps of:

identifying the private information store where the public information is to be stored, and adding the public information to the private information store for propagation to one or more personal information devices associated with the private information store.

2. The method of claim 1 wherein said step of selecting comprises searching the public information source utilizing a search engine to retrieve the public information and identifying the public information resulting from said search.

3. The method of claim 1 wherein said public information comprises a digital media file.

4. The method of claim 3 wherein said digital media file is an MP3.

5. The method of claim 1 wherein said public information is a data file.

6. The method of claim 1 wherein said public information comprises contact information.

7. The method of claim 1 wherein said step of selecting comprises receiving e-mail from a user who has selected the public information from the public information source.

8. The method of claim 1 wherein said public information comprises event information.

9. The method of claim 1 wherein said sync request button is virtual.

10. The method of claim 1 wherein said step of identifying comprises examining a unique identifier in a web browser on a client web browser.

11. The method of claim 1 wherein said step of identifying comprises prompting a user login and retrieving login information input by the user.

12. The method of claim 1 wherein said method further includes the step, following said step of identifying, of synchronizing the public information with the private information store.

13. The method of claim 1 wherein said private information store comprises a series of transactions reflecting additions to, modifications to, and subtractions from the private information store.

14. The method of claim 1 wherein said private information store comprises a quantity of data which is selected by and retained by a particular user.

15. The method of claim 14 wherein said private information store is retained on a server which is coupled to a global communications network and at least one information storage device.

16. The method of claim 1 wherein said private information store comprises a private information data store and at least one personal information device coupled via a communications network to the private information data store and exchanging information with the private information data store.

17. The method of claim 1 wherein said private information store comprises a plurality of personal information devices, each of which includes at least a portion of an individual's private information data.

18. A system for synchronizing public content from a public information web site to a private information store, comprising:

a sync enable button on the public information web site;

a pop-up window provided by a private information store provider responsive to the sync enable button on the public information web site; and a sync interface transfer button on the pop-up window initiating transfer of the public content to the private information store for synchronization between one or more personal information devices associated with the private information store.

19. The system of claim 18 wherein said public information web site is provided by an affiliate server and said affiliate server includes code enabling said sync button by directing a client web browser to the private information store provider.

20. The system of claim 18 wherein the sync enable button is provided on a file system interface.

21. The system of claim 18 wherein the sync enable button is provided adjacent to a set of contact information.

22. The system of claim 18 wherein the sync enable button is provided adjacent to event information.

23. The system of claim 18 wherein multiple public information entries are provided adjacent to check boxes, and the sync enable button syncs all entries checked by a user.

24. The system of claim 18 wherein said pop-up window includes a user login and retrieving login information input by the user.

25. The system of claim 18 wherein said system further includes at least one synchronization routine synchronizing the public content with the private information store.

26. The system of claim 18 wherein said private information store comprises a quantity of data which is selected by and retained by a particular user.

27. The system of claim 26 wherein said private information store is retained on a server which is coupled to a global communications network and at least one information storage device.

28. The system of claim 18 wherein said private information store comprises at least one personal information device coupled via a communications network to the private information store and exchanging information with the private information store.

29. The system of claim 18 wherein said private information store comprises a plurality of personal information devices, each of which includes at least a portion of an individual's private information data.

30. A computer-readable medium carrying instructions for performing synchronization of public content from a public information web site to a private information store, the instructions including instructions for performing the steps of:
    enabling a sync enable button on the public information web site;
    mapping the public content to a field in response to the sync enable button and
    transmitting the mapped data to a private information store for propagation to one or more personal information devices and applications associated with the private store.

31. A computer-readable medium of claim 30 wherein said step of enabling said sync button directs a client web browser to the private information store provider.

32. A computer-readable medium of claim 30 wherein said step of mapping the public content to a field in response to the sync enable button generates a window which includes a user login and retrieving login information input by a user.

33. A computer-readable medium of claim 30 further comprising the step of synchronizing the public content with the private information store.

34. A computer-readable medium of claim 30 wherein said private information store comprises a quantity of data which is selected by and retained by a particular user.

35. A computer-readable medium of claim 30 wherein said private information store is retained on a server which is coupled to a global communications network and at least one information storage device.

36. A computer-readable medium of claim 30 wherein said private information store comprises at least one personal information device coupled via a communications network to the private information data source and exchanging information with the private information data source.

37. A computer-readable medium of claim 30 wherein said private information store comprises a plurality of personal information devices, each of which includes at least a portion of an individual's private information data.

38. A method for transferring public information from a public information source to a private information space, comprising:
    receiving public information destined for the public information source responsive to a user-initiated indication that the public information source is to be provided to the private information space; and
    making the public information available to one or more personal information devices and applications by transmitting the public information identified in the receiving step to the private information space associated with the one or more personal information devices and applications.

39. The method of claim 38 wherein said step of receiving comprises receiving data responsive to a search of the public information source utilizing a search engine.

40. The method of claim 38 wherein said public information comprises a digital media file.

41. The method of claim 38 wherein said public information is a data file.

42. The method of claim 38 wherein said public information comprises contact information.

43. The method of claim 38 wherein said public information comprises event information.

44. The method of claim 38 further including the step of identifying the private information space associated with the user by a unique identifier in a client web browser.

45. The method of claim 38 further including the step of identifying the private information space associated with the user by prompting a user login and retrieving login information input by the user.

46. The method of claim 38 wherein said step of receiving comprises receiving an e-mail from a first user who has selected the public information to be provided to a second user's private information store.

47. A method for inputting public information into a plurality of personal information managers, comprising:
    determining content to be synchronized by receiving public information from a public information store via a communications network;
    storing the content in a data store specifically identified with a particular user; and
    providing the content to at least one personal information device capable of coupling to the data store via the global communications network.

48. The method of claim 47 wherein said step of determining comprises:
    providing code enabling a sync enable button on a public information web site; and
    providing code responsive to the sync enable button mapping the public content to a field.

49. The method of claim 48 wherein said step of storing comprises providing code transmitting the mapped data to a private information store.

50. The method of claim 48 wherein said step of providing the content comprises storing the content in a user-specific personal information space on a server coupled to the network, the server including at least one device engine coupled to receive the content and generate transactions providing the content to said at least one personal information device.

51. A method for making content from a public website available for synchronization between one or more personal information devices and applications, comprising the steps of:
provinding a sync request button on the public website;
associating the sync request button with the content on a page of the public website;
adding the content from the public website to a private information store unaffiliated with the public website upon accessing the sync request button;
wherein said step of adding the content from the public website to a private store includes the step of making the content available to the one or more personal information devices and applications.

52. A method as recited in claim 51, wherein said step of associating the sync request button with content on a page of the public website comprises the step of associating the sync request button with contact information including at least one of a person's name, company, title, mailing address, telephone number and email address.

53. A method as recited in claim 51, wherein said step of associating the sync request button with content on a page of the public website comprises the step of associating the sync request button with an event.

54. A method as recited in claim 51, wherein said step of associating the sync request button with content on a page of the public website comprises the step of associating the sync request button with a file referenced on the page of the website.

55. A method for making content from a public source available to one or more personal information devices and applications, comprising the steps of:
selecting the content on a the public store to be made available to the one or more personal information devices and applications;
indicating said step of selecting the content by activating a sync request associated with the content; and
adding the indicated content to a synchronization system on a private information store, the synchronization system capable of synchronizing the content on the one or more personal information devices and applications.

56. A method as recited in claim 55, said step of indicating said step of selecting the content by activating a sync request associated with the content comprising one of: 1) activating a virtual sync request button; 2) activating a key of a keyboard; 3) clicking a mouse, and 4) selecting an option from a virtual pull down menu.

57. A method for making content from a public website available to one or more personal information devices and applications, comprising the steps of:
selecting the content on a page of the public website to be made available to the one or more personal information devices and applications;
indicating said step of selecting the content by activating a sync request associated with the content; and
adding the content from the page of the public website to a synchronization system including a private information store, the synchronization system capable of synchronizing the content on the one or more personal information devices and applications.

58. A method as recited in claim 57, said step of indicating said step of selecting the content by activating a sync request associated with the content comprising one of: 1) activating a virtual sync request button; 2) activating a key of a keyboard; 3) clicking a mouse, and 4) selecting an option from a virtual pull down menu.

59. A method for making information on a public web page available to one or more personal information devices and applications, comprising the steps of:
designating an item of information on the web page for possible selection by associating a sync request indicator with the item of information;
selecting the item of information from the web page to be made available to the one or more personal information devices and applications;
indicating said step of selecting the item of information by activating the sync request indicator associated with the item of information;
not selecting other information from the web page, the other information that was not selected not being available to the one or more personal information devices and applications; and
adding the item of information from the web page of the public website to a synchronization system including a private information store, the synchronization system capable of synchronizing the item of information across the one or more personal information devices and applications.

60. A method as recited in claim 59, said step of indicating said step of selecting the content by activating a sync request indicator associated with the item of information comprising one of: 1) activating a virtual sync request button; 2) activating a key of a keyboard; 3) clicking a mouse, and 4) selecting an option from a virtual pull down menu.

* * * * *